United States Patent
Castelli et al.

(10) Patent No.: US 10,656,602 B2
(45) Date of Patent: May 19, 2020

(54) POWER TOOL ACCIDENT PREVENTION

(71) Applicant: International Business Machines Corporation, Armonk, NY (US)

(72) Inventors: Vittorio Castelli, Croton on Hudson, NY (US); Radu Florian, Danbury, CT (US); Gourab Kundu, White Plains, NY (US); Taesun Moon, Scarsdale, NY (US); Avirup Sil, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/285,380

(22) Filed: Feb. 26, 2019

(65) Prior Publication Data

US 2019/0187629 A1    Jun. 20, 2019

Related U.S. Application Data

(63) Continuation of application No. 15/187,897, filed on Jun. 21, 2016, now Pat. No. 10,303,126.

(51) Int. Cl.
*G06F 19/00* (2018.01)
*G05B 9/02* (2006.01)

(52) U.S. Cl.
CPC ...... *G05B 9/02* (2013.01); *G05B 2219/37563* (2013.01)

(58) Field of Classification Search
CPC combination set(s) only.
See application file for complete search history.

(56) References Cited

U.S. PATENT DOCUMENTS

| | | | |
|---|---|---|---|
| 10,303,126 B2* | 5/2019 | Castelli | G05B 9/02 |
| 2006/0167696 A1* | 7/2006 | Chaar | G10L 15/22 |
| | | | 704/270 |
| 2010/0289662 A1* | 11/2010 | Dasilva | F16P 3/147 |
| | | | 340/686.6 |
| 2014/0168266 A1* | 6/2014 | Kimura | G02B 27/0172 |
| | | | 345/633 |

FOREIGN PATENT DOCUMENTS

JP    2006-268348 A    10/2006

OTHER PUBLICATIONS

United States Notice of Allowance dated Jan. 15, 2019, in U.S. Appl. No. 15/187,897.
United States Office Action dated Dec. 14, 2018, in U.S. Appl. No. 15/187,897.

(Continued)

*Primary Examiner* — Robert G Bachner
(74) *Attorney, Agent, or Firm* — Anthony Curro, Esq.; McGinn I.P. Law Group, PLLC (57) ABSTRACT

A power tool accident prevention system receiving images from a static camera of a setup of a power tool, the system comprising: a processor; and a memory, the memory storing instructions to cause the processor to: analyze the images to identify inherent dangers in the setup of the power tool; identify at least one potential cause of an accident based on the identified inherent dangers; and activate an emergency safety measure of the power tool to avoid the at least one potential cause of the accident.

20 Claims, 5 Drawing Sheets

(56) References Cited

OTHER PUBLICATIONS

United States Office Action dated Nov. 20, 2018, in U.S. Appl. No. 15/187,897.
United States Office Action dated Oct. 9, 2018, in U.S. Appl. No. 15/187,897.
United States Office Action dated Aug. 8, 2018, in U.S. Appl. No. 15/187,897.

* cited by examiner

POWER TOOL ACCIDENT PREVENTION

CROSS-REFERENCE TO RELATED APPLICATIONS

The present application is a Continuation Application of U.S. patent application Ser. No. 15/187,897, filed on Jun. 21, 2016, the entire contents of which are hereby incorporated by reference.

BACKGROUND

The present invention relates generally to a power tool accident prevention system and more particularly, but not by way of limitation, to a system for preventing power tool accidents based on inputs received from any one or more of a static camera, a wearable camera, and user cognitive data from wearables.

There has been an increasing number of power tool accidents, the majority of which being caused by ineptitude, distraction, tiredness, fatigue, and haste. That is, accidents due to a failure of a power tool are rare and instead the accidents are generally caused by an incorrect use of the tool, an incorrect setup, a failure to wear protective gear, a failure of wearing the correct attire, a failure to follow safety precautions, failure to properly operate the equipment in a rested, alert state, etc.

Conventional safety techniques for power tools have considered detecting flesh within a proximity of a rotating blade and thereby stopping the power tool when the flesh is detected.

However, there is a technical problem in the conventional techniques in that the conventional techniques do not consider preventing accidents with power tools prior to the accident nearly occurring (i.e., near contact with flesh) or having occurred.

SUMMARY

In view of the technical problem in the art, the inventors have considered the technical solution to the technical problem by combining at least one of visual information obtained from a static camera and wearable cameras, and measurements of the user's cognitive state (e.g., using wearables), to provide an assessment of the risk of injuries due to power tools and thereby taking action to prevent an accident by, for example, cutting power to the tool, providing alerts to the user, providing a visualization of the hazard if the user's face protective device has head-mounted display capability, or the user is wearing a head mounted display, etc.

In an exemplary embodiment, the present invention can provide a power tool accident prevention system receiving images from a static camera of a setup or operation of a power tool, the system including a danger identification circuit configured to: analyze the images to identify inherent dangers in the setup or the operation of the power tool, and identify at least one potential cause of an accident based on the identified inherent dangers, and a power tool disabling circuit configured to activate an emergency safety measure of the power tool to avoid the at least one potential cause of the accident.

Further, in another exemplary embodiment, the present invention can provide a power tool accident prevention method, including receiving images from a static camera of a setup or operation of a power tool, analyzing the images to identify inherent dangers in the setup or the operation of the power tool, identifying at least one potential cause of an accident based on the identified inherent danger, and activating an emergency safety measure of the power tool to avoid the at least one potential cause of the accident.

Even further, in another exemplary embodiment, the present invention can provide a non-transitory computer-readable recording medium recording a power tool accident prevention program, the program causing a computer to perform: receiving images from a static camera of a setup or operation of a power tool, analyzing the images to identify inherent dangers in the setup or the operation of the power tool, identifying at least one potential cause of an accident based on the identified inherent danger, and activating an emergency safety measure of the power tool to avoid the at least one potential cause of the accident.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
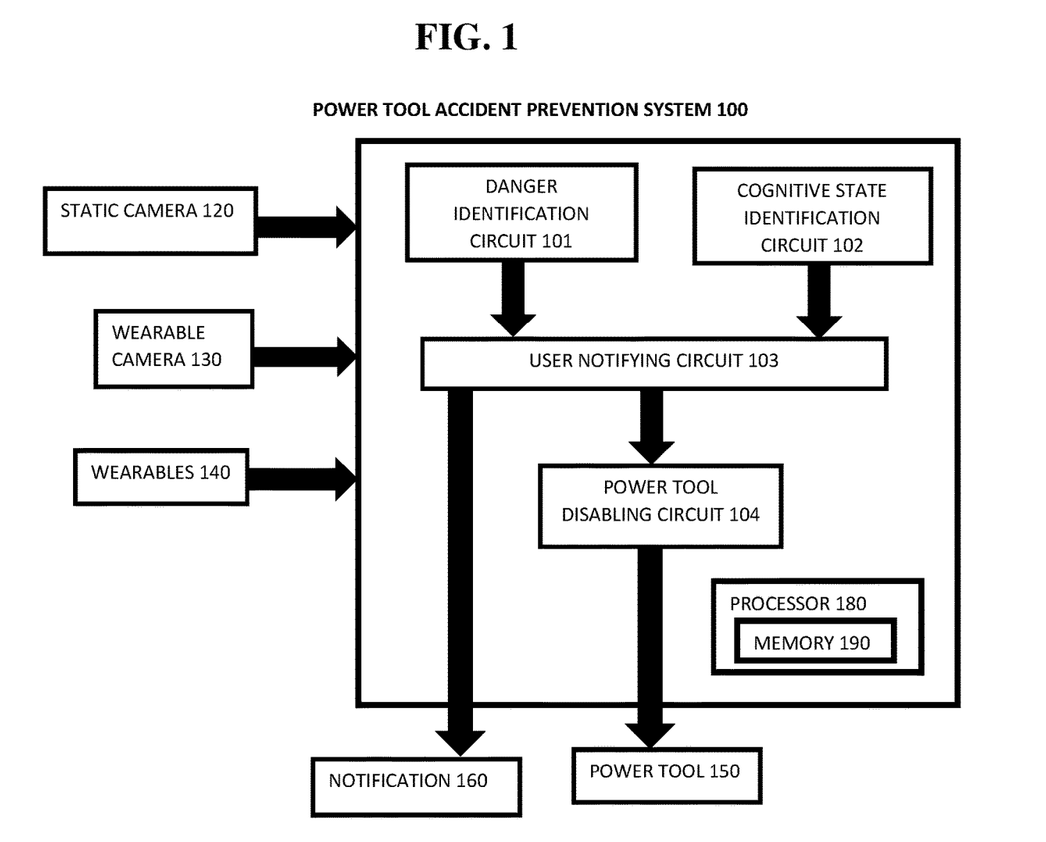
FIG. 1 exemplarily shows a block diagram illustrating a configuration of a power tool accident prevention system 100.

With reference now to FIG. 1, the power tool accident prevention system 100 includes a danger identification circuit 101, a cognitive state identification circuit 102, a user notifying circuit 103, and a power tool disabling circuit 104. The power tool accident prevention system 100 includes a processor 180 and a memory 190, with the memory 190 storing instructions to cause the processor 180 to execute each circuit of power tool accident prevention system 100. The processor and memory may be physical hardware components, or a combination of hardware and software components.

Although the power tool accident prevention system 100 includes various circuits, it should be noted that a power tool accident prevention system can include modules in which the memory 190 stores instructions to cause the processor 180 to execute each module of power tool accident prevention system 100.

Also, each circuit care be a stand-alone device, unit, module, etc. that can be interconnected to cooperatively produce a transformation to a result.

With the use of these various circuits, the power tool accident prevention system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically; the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 3:
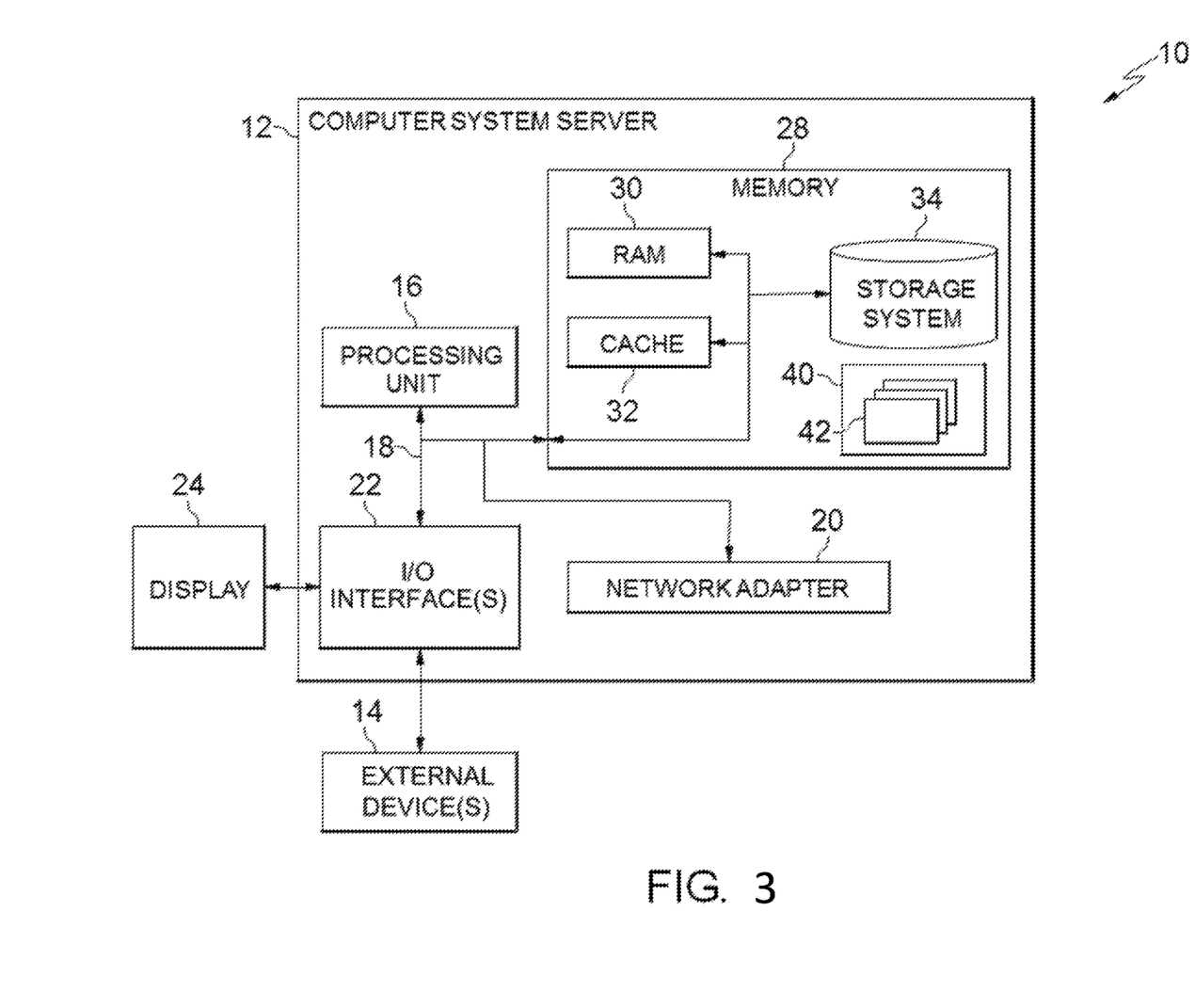
FIG. 3 depicts a cloud computing node 10 according to an exemplary embodiment of the present invention.
Figure 4:
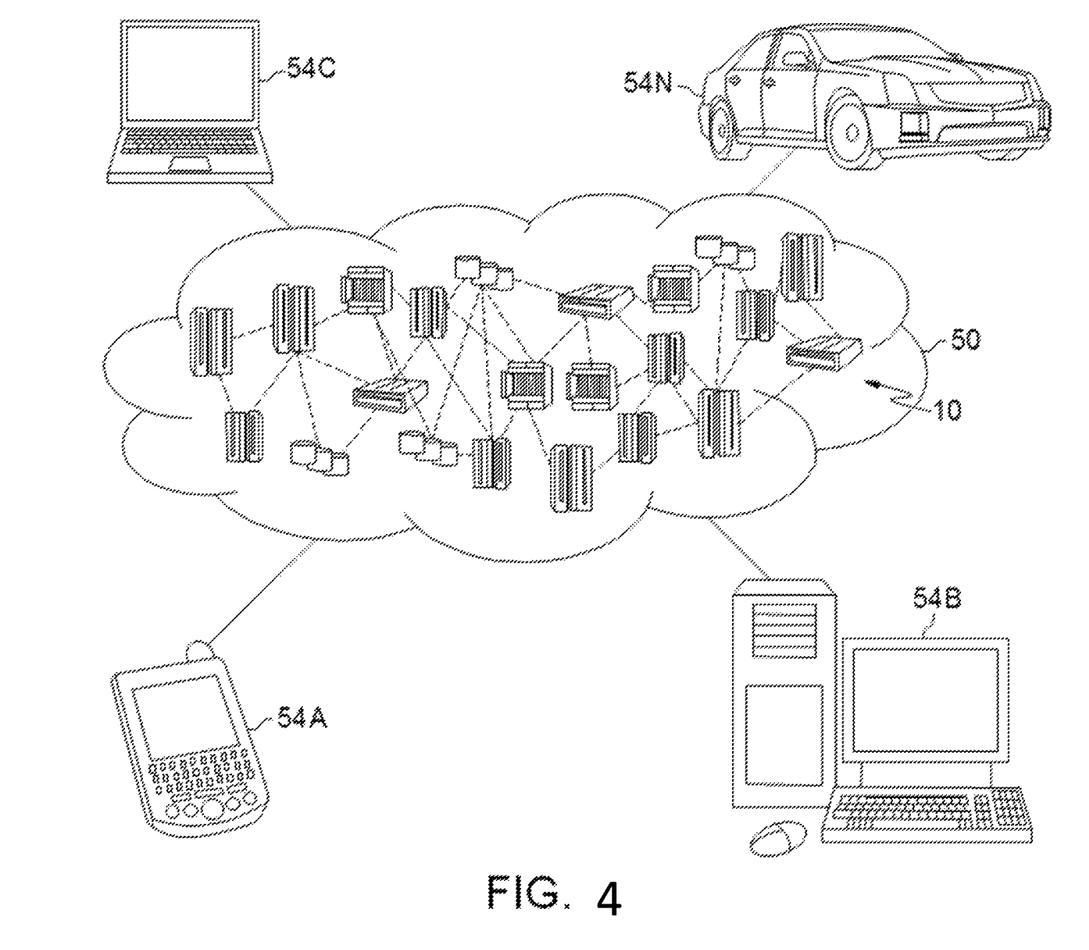
FIG. 4 depicts a cloud computing environment 50 according to another exemplary embodiment of the present invention.
Figure 5:
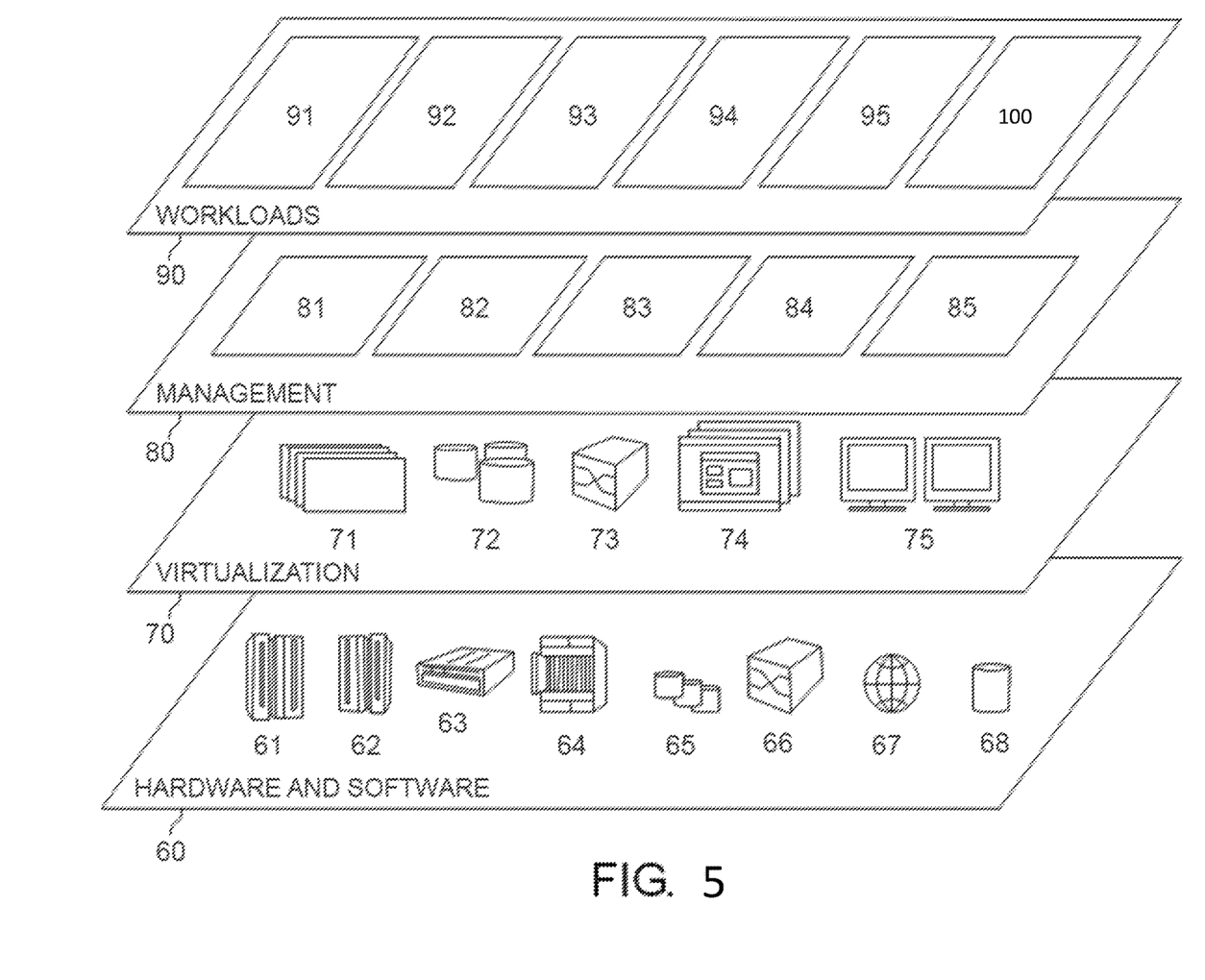
FIG. 5 depicts abstraction model layers according to an exemplary embodiment of the present invention.

Although as shown in FIGS. 3-5 and as described later, the computer system/server 12 is exemplarily shown in cloud computing node 10 as a general-purpose computing circuit which may execute in a layer the power tool accident prevention system 100 (FIG. 5), it is noted that the present invention can be implemented outside of the cloud environment.

Referring to FIG. 1, the power tool accident prevention system 100 receives images (video) from a static camera 120 or a camera mounted on a wearable (wearable camera 130 that the user has (e.g., wearable glasses) monitoring the use of the power tool by a user. The static camera 120 can be any type of camera (e.g., video camera) capable of capturing images or a plurality of cameras disposed at different positions in a room to map together an image. The wearable camera 130 including the camera can be any type of wearable capable of capturing video and transmitting video.

Further, the power tool accident prevention system 100 receives cognitive state data from wearables 140. Cognitive state data monitored by the wearables 140 can include, for example, heart rate, emotion, distraction, eye gaze, indications of impaired judgment, stress, or the like. That is, the cognitive state data monitored by the wearables 140 includes data about the cognitive state of the user that is not detectable from an image captured by the static camera 120 and the wearable camera 130.

The danger identification circuit 101 identifies potential causes of an accident using images (video) captured by the static camera 120 and/or the wearable camera 130 using image (e.g., video) analysis technology. The danger identification circuit 101 identifies the potential causes of an accident by analyzing for inherent dangers in the setup or the operation of the power tool 150.

The danger identification circuit 101 can identify inherent dangers in a setup when using the power tool like, for example, if the safety devices on the tool are correctly in place, if the user is using safety devices such as push sticks, push pads, etc. when appropriate, if the user is wearing the appropriate protective gear such as eye gear, gloves, protective aprons when appropriate, face masks when appropriate, hear protection always, dust mask, etc., if the user is wearing unsafe clothing (e.g., loosely fitting clothing, neckties, long-sleeved garbs, clothing with draw strings, gloves when not appropriate, jewelry, watches, rings, etc.), if the workpiece has been safely set up before operating the tool, if the user is using a correct posture, if the user is in the correct place with respect to the tool and the workpiece (e.g., not directly behind a planer, and not in the kickback path when using a table saw, if there is clutter/debris/other tools that could be in the way, that could be ignited by hot tools, that could be caught by the power tool, if the illumination of the work area is appropriate, if the power tool is off before the user plugs it in, or the like.

Also, the danger identification circuit 101 can identify if the user is making a mistake while using the tool by analyzing the image (e.g., video) to determine, for example, if the user is overreaching or overbalancing, if the workpiece is shifting or clamps become loose, the user has a body part in the path of the tool, a power chord becomes tangled while operating the tool or is moved in the path of the tool, etc.

That is, the danger identification circuit 101 analyzes the images captured by the static camera 120 and the wearable camera 130 to identify a mistake while using or inherent dangers in the setup of the power tool 150 (e.g., "a danger") and thereby an accident is likely to occur when using the power tool 150.

The cognitive state identification circuit 102 receives cognitive state data of the user of the power tool 150 via the wearables 140 and detects, for example, if the user is tired, if the user is distracted (e.g., by other people, by some external influence, or the like), if the user is under the influence of alcohol or other substance that might impair judgment (e.g., pain medications), etc. In other words, the cognitive state identification circuit 102 detects a "cognitive danger" of the user that would likely cause an accident should the power tool 150 be operated while the user is under the "cognitive danger" state.

Based on the danger identified by the danger identification circuit 101 and the cognitive danger identified by the cognitive state identification circuit 102, the user notifying circuit 103 sends a notification 160 to the user alerting the user of the dangerous condition (i.e., the likely accident as a result of the danger or the cognitive danger). Further, the notification also could be sent to a third party with some control or association with the user (e.g., the user's supervisor, spouse, etc.) for their intervention or action.

That is, the user notifying circuit 103 notifies the user (and optionally a third part) of a possibly dangerous condition by, for example, flashing an intermittent red or orange light, or by highlighting with a light emitting device at the area where the hazard is concentrated (i.e., the static camera 120 or the wearable camera 130 can include a light emitting device to emit light onto the work space to alert the user of the danger), by a sound, which could be incorporated in the ear protection device if the user is using one, by a vibration that can be delivered through the wearable camera 130 or the wearables 140, by a visualization such as if the user eye protection has head-mounted display capabilities by showing overlays on the area where the danger is concentrated or by emitting an image on the wearables 140.

In other words, when either one of the danger identification circuit 101 or the cognitive state identification circuit 102 identifies the danger or cognitive danger, respectively, the user notifying circuit 103 can issue a notification 160 to the user (and optionally the third party) such that the user can fix the issue causing the danger (and/or cognitive danger), stop using the power tool 150, make an adjustment, etc.

Based on the danger identified by the danger identification circuit 101 and the cognitive danger identified by the cognitive state identification circuit 102, the power tool disabling circuit 104 can remotely activate emergency safety measure on the power tool 150. For example, the power tool 150 can be equipped with a technology for allowing the power tool to receive a signal from the power tool accident prevention system such that the power tool 150 is enabled to receive an emergency signal from an external source. Thereby, the power tool disabling circuit 104 can activate an emergency safety measure on the power 150 such as, dropping a safety clip over a saw blade, causing a nail gun to not load a nail into the hammer, or the like.

Alternatively, the power tool disabling circuit 104 can cut power (e.g., turn off the power tool 150) to the power tool 150 if it is safe to do so according to manufacturer's instructions based on the danger (cognitive danger) being detected. For example, the power tool 150 can be equipped with an adapter with a remotely operated emergency switch that can be wirelessly triggered by the power tool disabling circuit 104 to cut power to the power tool 150. Or, since many power tools 150 have brakes that quickly stop the action as soon as the power is cut, these units can be adapted to include the power cut off feature.

Further, the power tool disabling circuit 104 can be triggered based on the user not obeying the notification 160 sent by the user notifying circuit 103. For example, if the user notifying circuit 103 notifies the user of a danger and the user does not change the situation to mitigate the danger, the power tool disabling circuit 104 can cut the power a predetermined amount of time after the user has not obeyed the notification 160. Also, a notification could be sent to a third party regarding the users disregard of the danger.

The predetermined amount of time to cut the power by the power tool disabling circuit 104 can be based on the type of danger (cognitive danger) identified by the danger identification circuit 101 or the cognitive state identification circuit 102. For example, if the danger detected is the user's thumb in the way of a saw path, the power tool disabling circuit 104 can be set up to cut the power within a second of the user being notified. Or, if the cognitive danger detected is the user being tired but the user is not currently using the power tool 150 (i.e., the user is still setting up the work space while the power tool is powered on), the power tool disabling circuit can wait a longer period of time to cut off the power.

In other words, the power tool disabling circuit 104 can be set up to disable power to the power tool 150 at the predetermined time after the user has been notified by the user notifying circuit 103 based on an assessment of a risk that the identified danger (cognitive danger) creates and the immediacy of the risk.

Figure 2:
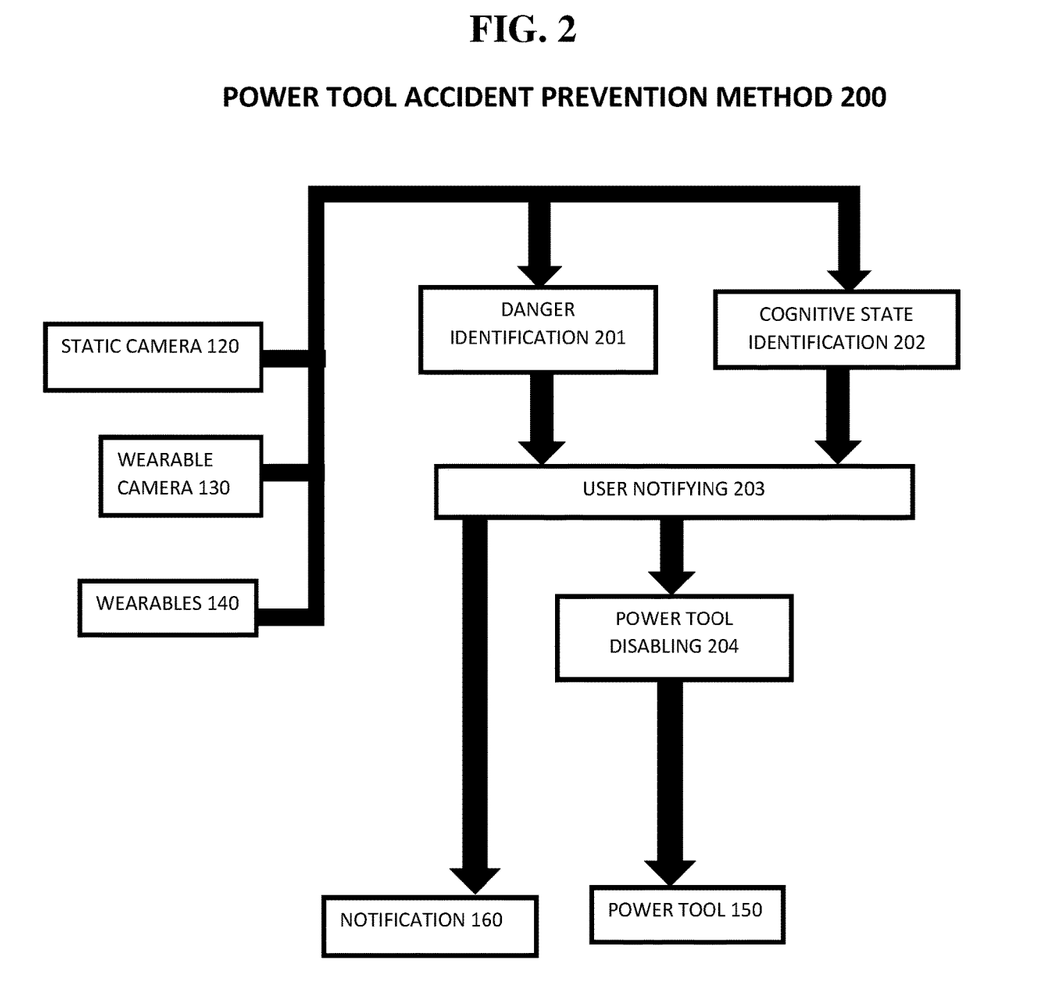
FIG. 2 exemplarily shows a high level flow chart for a power tool accident prevention method 200.

FIG. 2 shows a high level flow chart for a method 200 of power tool accident prevention.

Step 201 identifies potential causes of an accident using images (video) captured by the static camera 120 and/or the wearable camera 130 using image (video) analysis technology. That is, Step 201 identifies the potential causes of an accident by analyzing for inherent dangers in the setup or the operation of the power tool 150.

Step 202 receives cognitive state data of the user of the power tool 150 via the wearables 140 and detects, for example, if the user is tired, if the user is distracted (e.g., by other people, by some external influence, or the like), if the user is under the influence of alcohol or other substance that might impair judgment (e.g., pain medications), etc. In other words, the Step 202 detects a "cognitive danger" of the user that would likely cause an accident should the power tool 150 be operated while the user is under the "cognitive danger" state.

Based on the danger identified by Step 201 and the cognitive danger identified by Step 202, Step 203 sends a notification 160 to the user alerting the user of the dangerous condition (i.e., the likely accident as a result of the danger or the cognitive danger).

Based on the danger identified by Step 201 and the cognitive danger identified by Step 202, Step 204 remotely activates emergency safety measure on the power tool 150 or turns off the power (i.e., disables the power tool 150).

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multitenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country; state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public, or a large industry group and is owned by an organization selling cloud services.

Hybrid cloud: the cloud infrastructure is a composition of two or more clouds (private, community, or public) that remain unique entities hut are bound together by standardized or Proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/serve 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (TESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only; storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually; in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components, Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the power tool accident prevention system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A power tool accident prevention system receiving images from a static camera of a setup of a power tool and an operation of the power tool, the system comprising:
    a processor; and
    a memory; the memory storing instructions to cause the processor to:
        analyze the images to identify inherent dangers in both of the complete setup of the power tool and the operation of the powertool, irrespective of an environment of the power tool before the setup of the power tool by a user;
        identify at least one potential cause of an accident caused by the user while operating the power tool as a result of the identified inherent dangers; and
        activate an emergency safety measure of the power tool to avoid the at least one potential cause of the accident.

2. The system of claim 1; wherein the memory further stores instructions to cause the processor to further analyze at least one image captured by a wearable camera to identify the inherent dangers in the setup of the power tool, and
    wherein the emergency safety measure occurs prior to the accident.

3. The system of claim 1, wherein the memory further stores instructions to cause the processor to:
    send a notification to the user alerting a user of the at least one potential cause of the accident.

4. The system of claim 1, wherein the at least one potential cause of the accident includes a lack of use of a safety device by the user, and
    wherein the at least one potential cause of the accident includes an improper use of a safety device by the user.

5. The system of claim 1, wherein the at least one potential cause of the accident includes identifying, via the images, a hazard in a work area setup.

6. The system of claim 5, wherein the hazard includes clutter due to any one of:
    debris;
    a work piece;
    a power cord; and
    a work tool.

7. The system of claim 1, wherein the at least one potential cause of the accident includes a mistake while using the power tool or an inherent danger in the setup of the power tool.

8. The system of claim 1, wherein the at east one potential cause of the accident includes an improper setup for using the power tool, and
    wherein the improper setup is determined via a combination of a static camera capturing the setup and a wearable camera worn by the user.

9. The system of claim 1, wherein the at least one potential cause of the accident includes a part of the user being in an operational path of the power tool.

10. The system of claim 1, wherein the at least one potential cause of the accident includes a work piece being improperly placed or improperly secured for operation by the power tool, and
    wherein the memory further stores instructions to cause the processor to send a notification to a second user alerting the second user of the at least one potential cause of the accident.

11. The system of claim 1, wherein the memory further stores instructions to cause the processor to:
    identify a cognitive danger as the potential cause of the accident for the user using the power tool based on cognitive state data received from a wearable.

12. The system of claim 11, wherein the cognitive danger includes the user being tired.

13. The system of claim 11, wherein the cognitive danger includes a distraction level of the user.

14. The system of claim 11, wherein the cognitive danger includes a measurement to determine if the user is under an influence of a substance.

15. The system of claim 3, wherein the notification includes at least one of:
    a sound alert;
    a light emitted in a work space visible to the user;
    a visual cue to the user; and
    an alert image displayed on a screen of a wearable.

16. The system of claim 1, wherein the emergency safety measure includes activating a kill switch to turn off the power tool.

17. The system of claim 3, wherein the memory further stores instructions to cause the processor to:
    activate the emergency safety measure at a predetermined time after the processor sends the notification to the user.

18. The system of claim 3, wherein the memory further stores instructions to cause the processor to:
    activate the emergency safety measure at a predetermined time after a user has ignored the notification sent by the processor, and
    wherein the predetermined time is set based on an immediacy of the accident if the user continues to ignore the notification.

19. A power tool accident prevention method, comprising:
    receiving images from a static camera of a setup of a power tool and an operation of the power tool;
    analyzing the images to identify inherent dangers in both of the complete setup of the power tool and the operation of the power tool, irrespective of an environment of the power tool before the setup of the power tool by a user;
    identifying at least one potential cause of an accident caused by the user while operating the power tool as a result of the identified inherent dangers; and
    activating an emergency safety measure of the power tool to avoid the at least one potential cause of the accident.

20. A non-transitory computer-readable recording medium recording a power tool accident prevention program, the program causing a computer to perform:
    receiving images from a static camera of a setup of a power tool and an operation of the power tool;
    analyzing the images to identify inherent dangers in both of the complete setup of the power tool and the operation of the power tool, irrespective of an environment of the power tool before the setup of the power tool by a user;

identifying at least one potential cause of an accident caused by the user while operating the power tool as a result of the identified inherent dangers; and activating an emergency safety measure of the power tool to avoid the at least one potential cause of the accident.

* * * * *